United States Patent [19]

Hugentobler et al.

[11] Patent Number: 5,765,489
[45] Date of Patent: Jun. 16, 1998

[54] PROCESS FOR THE TREATMENT OF SOLID RESIDUE FROM REFUSE INCINERATION PLANTS, AND APPARATUS FOR PERFORMING THE PROCESS

[75] Inventors: Ernst Hugentobler, Wermatswil; Hans Rüegg, Wohlen, both of Switzerland; Karl-Heinz Pflügl, Weinböhla; Norbert Kiethe, Friedewald, both of Germany; Ruedi Frey, Effretikon, Switzerland; Anton Mayer, Leoben; Theo Rey, Aarau, both of Austria; Alfred Edlinger, Baden, Switzerland

[73] Assignees: Von Roll Umwelttechnik AG, Zurich; Holderbank Financiere Glarus AG, Glarus, both of Switzerland

[21] Appl. No.: 563,025

[22] Filed: Nov. 27, 1995

[30] Foreign Application Priority Data

Nov. 25, 1994 [CH] Switzerland ............... 03 566/94-1

[51] Int. Cl.$^6$ ...................................................... F23J 3/00
[52] U.S. Cl. ........................ 110/344; 110/235; 110/250; 110/165 A; 106/DIG. 1; 588/201
[58] Field of Search ........................ 110/344, 346, 110/165 A, 259, 235, 165 R, 250; 588/256, 201; 106/DIG. 1

[56] References Cited

U.S. PATENT DOCUMENTS

| | | | |
|---|---|---|---|
| 4,787,320 | 11/1988 | Raaness et al. | 110/250 |
| 5,143,355 | 9/1992 | Iwamura et al. | 266/160 |
| 5,301,620 | 4/1994 | Nagel et al. | |
| 5,320,050 | 6/1994 | Ishida et al. | 110/259 X |
| 5,511,496 | 4/1996 | Schoener et al. | 110/165 A X |

FOREIGN PATENT DOCUMENTS

| | | |
|---|---|---|
| 0 293 545 A2 | 12/1988 | European Pat. Off. |
| 0 430 369 A1 | 6/1991 | European Pat. Off. |
| 0 515 792 A2 | 12/1992 | European Pat. Off. |
| 08/563025 | 11/1995 | European Pat. Off. |
| 41 12 162 C1 | 7/1992 | Germany |
| 42 30 062 A1 | 3/1994 | Germany |
| 43 01 353 C1 | 5/1994 | Germany |
| 43 27 237 C1 | 8/1994 | Germany |
| 08/648003 | 5/1996 | WIPO |

OTHER PUBLICATIONS

European Search Report No. RS 95077, dated Jun. 26, 1995.

*Primary Examiner*—Henry A. Bennett
*Assistant Examiner*—Susanne C. Tinker
*Attorney, Agent, or Firm*—Oblon, Spivak, McClelland, Maier & Neustadt, P.C.

[57] ABSTRACT

A process for the treatment of solid residue from a refuse incineration plant, involving:

melting the solid residue in a first heating chamber under oxidizing conditions to provide a melt;

reducing any heavy metal compounds present in the melt to elemental metal in a second heating chamber; and transferring the resulting melt to a third heating chamber; wherein any elemental metal is sedimented in each heating chamber and the sedimented elemental metal is continuously returned from two of the heating chambers to the remaining heating chamber, wherein the elemental metal is collected in at least one of the first or second heating chambers and discharged therefrom, and an apparatus for performing the process.

26 Claims, 1 Drawing Sheet

PROCESS FOR THE TREATMENT OF SOLID RESIDUE FROM REFUSE INCINERATION PLANTS, AND APPARATUS FOR PERFORMING THE PROCESS

BACKGROUND OF THE INVENTION

1. Field of the Invention

The present invention relates to a process for the treatment of solid residue, such as slag, fly ash and filter dusts, from refuse incineration plants, and to an apparatus for performing the process.

2. Discussion of the Background

In refuse incineration plants approximately 30 to 35% of the amount of refuse incinerated remains as slag. This slag still contains up to 5% of unburned organic constituents and approximately 5 to 10% of different metals, mainly iron. At the present time the slag is dumped after appropriate mechanical treatment, or is used as base material in civil engineering work, such as road building. Other, finer solid residues, such as fly ash, boiler ash and filter dust, have to be disposed of separately in special refuse dumps. As a rule these waste materials are not further treated. Unburned organic fractions and water-soluble heavy metal compounds in the slag give rise to additional problems with respect to further use or dumping, since they lead to an unacceptable burden on water resources.

In order to deal with this environmental burden it has already been proposed to convert the solid residues from refuse incineration plants into a glass-like state by a melting process. In such a melting process, the organic constituents are burned and the heavy metals and other substances detrimental to the environment which still remain are enclosed in a water-insoluble glass matrix. The melting-down process is carried out in conventional glass melting plants. In order to use the slag in this process, the raw slag must first undergo an expensive pretreatment which involves the removal of iron by magnet separators and the crushing and screening of the slag. The glass obtained as a granulate in this process was until recently still used in the building industry. Because of more stringent environmental requirements, a granulate of this kind can no longer be used as a matter of course for building purposes, such as road building.

Various proposals have been made for the solution of these problems. For example, the fundamental principles concerning rendering the residues inert, particularly metals and heavy metals, by melting processes can be found in "Müllverbrennung und Umwelt" (Refuse Incineration and the Environment), volume 4, by Prof. Dr.-Ing. Karl J. Thomé-Kozmiensky, published by EF-Verlag für Energie und Umwelttechnik GmbH, Berlin (1990), pages 339 to 359. On page 350 it is proposed to separate heavy metals from the residual melt by density separation, while reference is made to other electric melting processes. However, no concrete implementation of this process is described.

In DE-C-41 17 444, a process is described in which the grate ash, such as fly ash, boiler ash and filter dust, from a refuse incineration plant is temporarily stored in a collecting bunker and freed from iron scrap by a magnet separator. This scrap is then mechanically comminuted. For the separation of iron scrap and other larger fractions the ash has to be intensively cooled, or cooling is at least required on storage. The (cooled) solid residue is then fed to a melting furnace, in which it is continuously melted down with the supply of energy. At the bottom of this melting furnace, the melt enriched with metals is intermittently drawn off and the remaining melt is continuously drawn off at a side wall of the melting furnace and cooled, whereby a glass-like product is obtained.

Another process is described in EP-A-93104418.4, in which the residue from the incineration of sweepings or refuse, which has a temperature of between 600° and 900° C., is cooled to approximately 80° C. by discharge into water and temporarily stored in a bunker. The residue is heated in a reactor to a temperature of over 1000° C., thus releasing the volatile metals and metal compounds as gases. The compounds of metallic elements, particularly heavy metals, are first oxidized and then reduced. Iron and the metals soluble in iron are collected in a melt in the reactor. From the remaining slag an environmentally tolerable product having hydraulic and/or pozzolanic properties can be produced, for which purpose the slag melt taken from the reactor in the molten state is quenched and granulated. This product is mixed as a mineral binder with cement or concrete. The reactor described is a tiltable converter which is spherical and contains the metal melt in the bottom region and the remaining melt above it. By gradual tilting, the molten slag or residual melt can first be drawn off from a tapering outlet at the top of the converter, whereupon the metal bath or metal melt can be poured into a suitable ladle for transport elsewhere.

These known processes are complicated and the composition of the molten product obtained is controllable only to a limited extent.

SUMMARY OF THE INVENTION

Accordingly, one object of the present invention is to provide a continuous process for the removal of undesired heavy metals and for the production of a molten product having desired properties from the solid residues obtained in a refuse incineration plant.

A further object of the present invention is to provide an apparatus for use in performing the above continuous process.

These and other objects of the present invention have been satisfied by the discovery of a process for the treatment of solid residue from a refuse incineration plant, comprising:

melting slag from incineration of refuse in a first heating chamber under oxidizing conditions to provide a melt;

reducing any heavy metal compounds present in the melt to elemental metal in a second heating chamber; and transferring the resulting melt to a third heating chamber; wherein any elemental metal is sedimented in each heating chamber and the sedimented elemental metal is continuously returned from two of the heating chambers to the remaining heating chamber, wherein the elemental metal is collected in at least one of the first or second heating chambers and discharged therefrom, and an apparatus for performing the process.

BRIEF DESCRIPTION OF THE FIGURES

A more complete appreciation of the invention and many of the attendant advantages thereof will be readily obtained as the same becomes better understood by reference to the following detailed description when considered in connection with the accompanying FIGURE, wherein.

DETAILED DESCRIPTION OF THE PREFERRED EMBODIMENTS

Figure 1:
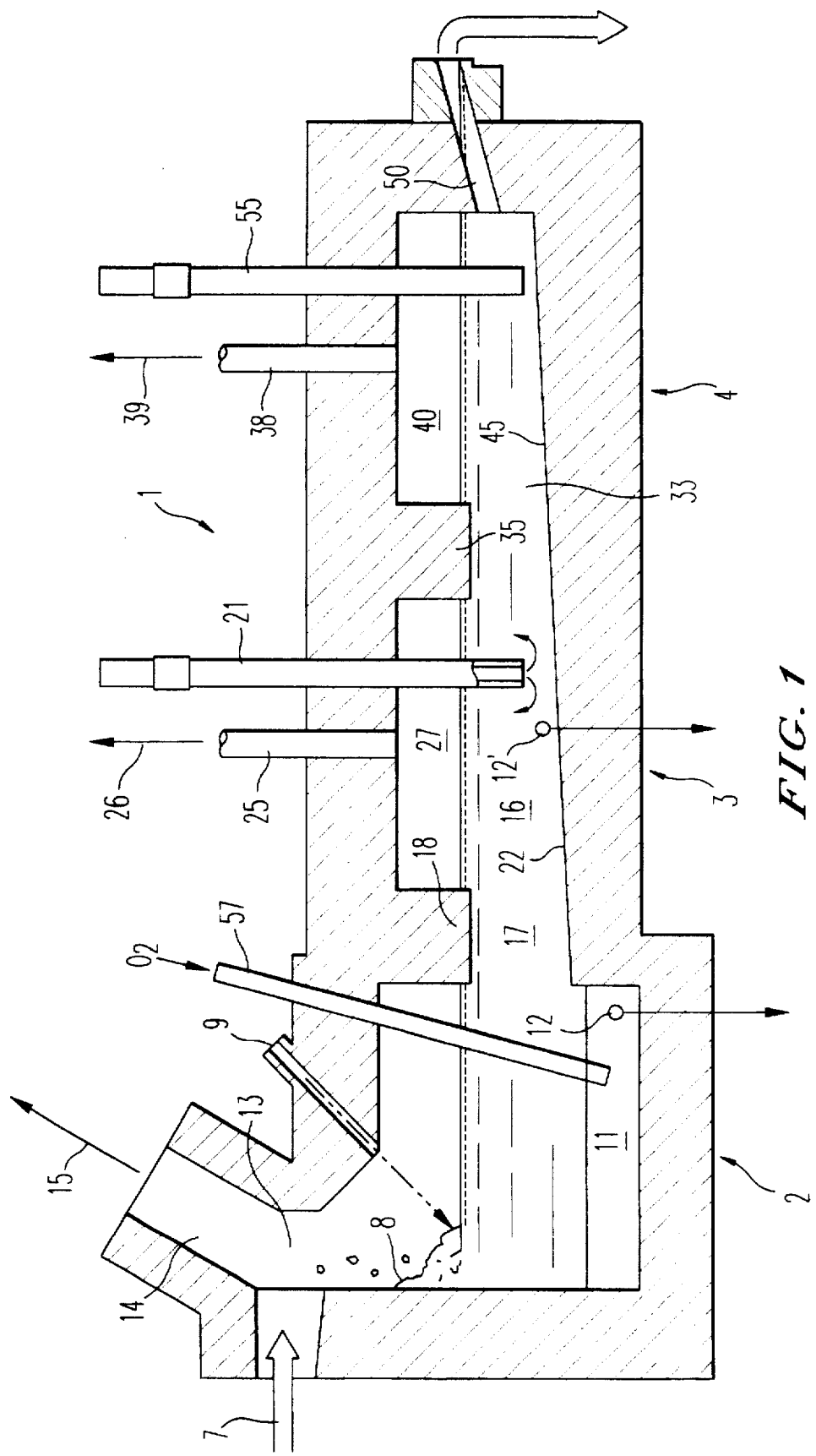
FIGURE 1 shows a schematic representation of the apparatus for performing the present process.

The present process is performed in a melting furnace which is divided into three furnace zones. By using this divided melting furnace and through the continuous return of the molten sedimented heavy metal, mainly copper, to the second or first heating chamber, extensive separation of undesired heavy metals from the melt is achieved. At the same time, the expenditure of energy is considerably lower than in conventional processes and plants. In addition, exceptional control can be exerted over the different processes occurring in the heating chambers arranged in succession, such as oxidation, reduction and removal of undesired heavy metals. Because of the return of the sedimented melt of the heavy metals from the third melting chamber to a preceding melting chamber, the inclusion of corresponding oxides into the slag melt during the after-treatment in the third heating chamber is prevented. The molten product can thus be used as a hydraulic binder or as an additive in hydraulic binders without endangering the environment. At the same time, the properties of the molten product, particularly its iron content, can be optimized for the intended purpose.

Because of its flexibility the process can be immediately adapted to account for a change in the slag composition. Since, in accordance with the invention, the treatment is preferably carried out in a plant adjoining the refuse incineration plant and the solid residues are fed directly to the melting furnace in the hot state, there is also a significant energy savings.

In the first heating chamber of the present process, a melting and oxidation process takes place. The gaseous substances thus produced can be returned, in countercurrent to the descending slag, to the refuse incineration furnace. Since these gases generally have a temperature of 1100° C. to 1600° C., the temperature in the refuse incineration chamber, particularly in the bottom part of the grate, is raised considerably, so that complete combustion and increased thermal efficiency of the refuse incineration are achieved. These gases then pass to a waste gas cleaning stage, together with the gases of the refuse incineration plant, so that there is no need for separate waste gas cleaning for the first heating chamber.

Additional advantages of the invention can be seen from the following description.

In FIGURE 1, a melting furnace 1 having three cylindrical heating chambers 2, 3 and 4 is shown. A chute indicated by the arrow 7, and coming from a refuse incineration plant (not shown), leads into the first heating chamber 2. The slag from the refuse incineration plant is metered via the chute 7 onto a heap 8. In the top region an oxygen burner 9 operated with oil or gas and leading obliquely into the first heating chamber 2 is provided as a heating means and heats the slag to a temperature of from 1400° C. to 1600° C., preferably around 1550° C. Other heating means are also acceptable for use in the present process, such as electric heating, in which case oxygen is fed to the slag at the same time. In addition, fossil fuel heating with preheated air may also be used. In the bottom or floor region of the first heating chamber 2 is provided a collecting well 11 which has a tapping opening 12, through which collected molten metals are periodically drawn off and through which the first heating chamber 2 can be emptied for inspection work. A lance 57, through which oxygen can be supplied, leads into the collecting well 11. Lance 57 serves to ensure complete oxidation of iron, aluminum and carbon present in the slag.

In section the first heating chamber 2 has the shape of a recumbent L and has a so-called top furnace 13 in the shorter limb of the L. In this top furnace 13 is connected a waste gas duct 14 which returns the gaseous substances produced by the heating, and indicated by the arrow 15, to the combustion chamber (not shown) of the refuse incineration plant, where they are cooled in the waste heat boiler and thus can make a significant contribution to the improvement of the thermal efficiency of the entire plant.

The melt 16 flows via a first passage 17 into the second heating chamber 3. In the top region of the passage 17 is provided an immersed rib 18 or stripper rib, which holds back the gall floating on the melt 16 and ensures the separation of the gas spaces in the two heating chambers 2 and 3 above the melt 16. Arranged in this second heating chamber 3 are, coming from above, three or four vertical heating electrodes, of which only one (21) is shown and which, as resistance heaters, keep the temperature of the melt 16 constant. The heating electrode 21 may be a hollow cylindrical graphite electrode having good electrical conductivity. Through the hollow cylindrical graphite electrode 21, fly ash, boiler ash and filter dust from the refuse incineration plant can be introduced, thus passing into the melt 16 and consequently also being enclosed in the glass matrix subsequently formed. As an alternative to the type of heating illustrated, other direct current or alternating current heating means may be used.

In the top region of the second heating chamber 3, referred to as top furnace 27, is arranged an outlet duct 25 for removing gaseous substances, such as heavy metal vapors, indicated by the arrow 26.

A second passage 33 conducts the melt 16 into the third heating chamber 4. This passage 33 has at the top an immersed rib 35 or stripper rib which ensures the separation of the two gas spaces of the heating chambers 3 and 4. In the top region of the third heating chamber 4, also referred to as top furnace 40, is provided an outlet duct 38 for escaping gaseous substances indicated by the arrow 39. In the third heating chamber 4 are arranged additional heating electrodes, of which only one (55) is shown. The latter serves essentially to maintain the temperature of the melt. This heating chamber may also be heated by other types of heating means, such as burners.

The floor 45 of the third heating chamber 4 is inclined towards the second heating chamber 3, whose floor 22 forms a continuation of the floor 45 and is inclined in the direction of the first heating chamber 2. The inclination of the floors 22, 45 causes sedimented droplets of the metal melt to be continuously returned, in countercurrent to the slag melt, to the first heating chamber 2 and collected in the collecting well 11. Because of the continuous removal of the metal melt from the third heating chamber 4, the equilibrium between metal oxide dissolved in the melt and sedimenting metal melt is shifted in favor of the latter. This ensures complete removal of undesired heavy metals, such as copper, from the melt.

According to another embodiment of the invention (not illustrated) a collecting well is arranged in the bottom region of the second heating chamber 3, and in it the metal melt from the second and third heating chambers collects. In addition, it may be expedient to arrange a single collecting well in the second heating chamber, in which case the floor of the first and third heating chambers is inclined in the direction of the second heating chamber.

On the right-hand side of the third heating chamber 4 is provided an outlet 50, which is in the form of a siphon and is slightly inclined in the upward direction, for drawing off the slag melt or glass melt 16 freed from undesired heavy metals. The melt is then continuously passed into a bath (not shown) containing a cooling liquid, such as water, and quenched. A glassy granulate is thus obtained, which because of its hydraulic binding property can be used as a building material, particularly as a substitute for clinker, in the cement industry.

The outlet ducts 25 and 38 in the second and third heating chambers 3, 4 can each be connected to a separate plant, or can be conjointly connected to a common plant, for waste gas treatment (not shown).

The preferred mode of operation of the above melting furnace 1 is described below:

The hot slag from the refuse incineration plant is heated in the first heating chamber 2 to a temperature of, preferably approximately 1550° C., whereby the solid residues of the slag are melted. At the same time, organic constituents of the slag are burned and metals and metal compounds are oxidized. The oxidic constituents of the hot slag melt down very quickly in the first heating chamber 2 and the metals which are contained in the slag, mainly iron, and which have not been oxidized during the melting, sink into the collecting well 11 because of density differences. In order to convert the metallic iron completely into iron oxide, oxygen is introduced through the lance 57 into the collecting well 11. As a result, only metals nobler than iron, such as copper, remain in the metallic melt. The oxides produced dissolve in the slag melt. The heat of reaction freed in the oxidation is used to melt the slag in the first heating chamber 2.

The metal melt in the collecting well 11 is tapped at the tapping opening 12. The hot gases 15 produced by the melting and oxidation process in the first heating chamber 2 are fed, in countercurrent to the descending slag, via the waste gas duct 14 to the incineration chamber of the refuse incineration plant. Since the hot gases 15 have a temperature of 1100° C. to 1600° C., they raise the temperature in the refuse incineration chamber, particularly in the bottom part of the grate, thus leading to complete combustion and greater thermal efficiency of the plant. The hot gases 15 pass into the waste gas cleaning plant together with the gases from the refuse incineration, so that separate waste gas cleaning is not required for the first heating chamber 2.

The melt 16, in which oxides of iron and other heavy metals are dissolved, then passes via the (optionally heated) passage 17 into the second heating chamber 3. The top furnace 27 above the melt 16 is hermetically sealed, relative to the top furnace 13 of the first heating chamber 2, by the stripper rib 18. Reducing agents are added to the melt 16 in the heating chamber 3 and provide the reduction to metal of, first, the nobler heavy metal oxides and then of any iron oxide present. The degree of reduction of the melt 16 can be adjusted through the amount and type of the reducing agents. The reducing agents used include any conventional reducing agent used in the reduction of metallic compounds in conventional extractive metallurgy practice, such as those described in Kirk-Othmer Encyclopedia of Chemical Technology, 4th Ed., Vol. 16, pp. 320–352 (1995), which is hereby incorporated by reference. These reducing agents include, but are not limited to, hydrogen, carbon monoxide, natural gas, carbon, silicon, and carbonaceous fuels. The metals evaporate and/or sink as a melt to the floor 22 because of their high density. As a result of the slope of the floor 22, the molten metals are returned by the force of gravity to the first heating chamber 2 and into the collecting well 11.

The redox processes are actively supported by the graphite of the heating electrodes 21 and of the intense convection flow emanating from them. In the top furnace 27, which is adjusted to reducing conditions and hermetically sealed relative to the outside, the evaporated heavy metals cannot re-oxidize. They are drawn off there via the outlet duct 25 and separated out in a separate cleaning plant (not shown). They are then in concentrated form and are passed on for further use.

From the second heating chamber 3 the melt 16 passes via the (optionally heated) passage 33 into the third heating chamber 4. In this heating chamber 4 the residence time, and thus the duration of the residual reductions of the heavy metal oxides, should preferably be lengthened. If necessary, reducing agents can again be added here. Volatile heavy metals still produced in the residual reduction evaporate and are discharged via the outlet duct as gaseous substances 39, then being fed to a cleaning plant. These heavy metals 39 can be discharged and cleaned together with the heavy metal vapors or gaseous substances 26 from the second heating chamber 3.

The non-volatile heavy metals contained in the melt 16, mainly copper, sediment and collect on the inclined floor 45, from which they flow back into the second heating chamber 3 and then into the first heating chamber 2. The slag melt 16 largely freed from undesired heavy metals finally flows via the submerged siphon 51 to the granulate production stage. A content of iron oxide in the melt can be desirable for further use.

The heating electrodes 21, 55 can each be composed of carbon (graphite) or of molybdenum. If they are composed of carbon, the vertical insertion of the heating electrodes in the respective heating chamber 3 or 4, as illustrated, has the advantage that the carbon acts at the same time as a reducing agent for the heavy metals contained in the melt.

Although heating chambers 2, 3 and 4 are preferably cylindrical in shape, it is also entirely possible to use other shapes.

The fly ash, boiler ash and filter dust may if desired also be introduced into the first heating chamber 2. In this case they should first be subjected to an acid wash or reduction melting for the partial removal of metals.

This application is based on Swiss Patent Application 03 566/94-1, filed with the Swiss Patent Office on Nov. 25, 1994, the entire contents of which are hereby incorporated by reference.

Obviously, additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the treatment of solid residue from a refuse incineration plant, comprising:

melting slag from incineration of refuse in a first heating chamber under oxidizing conditions to provide a melt, wherein said oxidizing conditions are provided by a top furnace having one or more downwardly directed oxygen burners extending from an upper region of said first heating chamber into said melt;

reducing any heavy metal compounds present in the melt to elemental metal in a second heating chamber; and transferring the resulting melt to a third heating chamber;

wherein any elemental metal is sedimented in each heating chamber and the sedimented elemental metal is continuously returned from the second heating chamber to the first heating chamber or from the third heating chamber to the second heating chamber or both simultaneously, wherein the elemental metal is collected in at least one of the first or second heating chambers and discharged therefrom.

2. The process according to claim 1, wherein the sedimented elemental metal is continuously returned from the third heating chamber to the second heating chamber and simultaneously from the second heating chamber to the first heating chamber, collected in the first heating chamber and discharged therefrom.

3. The process according to claim 1, wherein any iron present in the first heating chamber is oxidized substantially completely, and the heat of reaction produced is used for heating and melting the slag.

4. The process according to claim 1, wherein a reducing agent is introduced into the second heating chamber to aid in the reduction of any heavy metal compounds present.

5. The process according to claim 1, further comprising feeding into the melt in the second heating chamber, a solid residue of fine particle size.

6. The process according to claim 5, wherein said solid residue of fine particle size is a member selected from the group consisting of fly ash, boiler ash and filter dusts.

7. The process according to claim 1, wherein a gas selected from the group consisting of reducing protective gases and protective gases inert to the melt, is introduced into a top region of at least one of the second or third heating chambers.

8. The process according to claim 1, further comprising returning any gaseous substances produced in the first heating chamber to the refuse incineration plant.

9. A process for the treatment of solid residue from a refuse incineration plant, comprising:

melting the solid residue in a first heating chamber under oxidizing conditions to provide a melt, wherein said oxidizing conditions are provided by a top furnace having one or more downwardly directed oxygen burners extending from an upper region of said first heating chamber into said melt;

reducing any heavy metal compounds present in the melt to elemental metal in a second heating chamber; and transferring the resulting melt to a third heating chamber;

wherein any elemental metal present is sedimented in each heating chamber and the sedimented elemental metal is continuously transferred from the first and third heating chambers to the second heating chamber, wherein the elemental metal is collected in the second heating chamber and discharged therefrom.

10. The process according to claim 9, wherein the sedimented elemental metal is continuously supplied from the first and third heating chambers to the second heating chamber, collected in the second heating chamber and discharged therefrom.

11. The process according to claim 9, wherein any iron present in the first heating chamber is oxidized substantially completely, and the heat of reaction produced is used for heating and melting the slag.

12. The process according to claim 9, wherein a reducing agent is introduced into the second heating chamber to aid in the reduction of any heavy metal compounds present.

13. The process according to claim 9, further comprising feeding into the melt in the second heating chamber, a solid residue of fine particle size.

14. The process according to claim 13, wherein said solid residue of fine particle size is a member selected from the group consisting of fly ash, boiler ash and filter dusts.

15. The process according to claim 9, wherein a gas selected from the group consisting of reducing protective gases and protective gases inert to the melt, is introduced into a top region of at least one of the second or third heating chambers.

16. The process according to claim 9, further comprising returning any gaseous substances produced in the first heating chamber to the refuse incineration plant.

17. An apparatus for treatment of a solid residue from a refuse incineration plant, comprising a melting furnace, wherein the melting furnace comprises:

a first heating chamber having a heating device provided therein, wherein the first heating chamber has, in an upper region thereof, a top furnace wherein one or more downwardly directed oxygen burners are provided, a second heating chamber which is electrically heated; and a third heating chamber;

wherein the first heating chamber and the second heating chamber are connected to one another via a first passage and the second heating chamber and the third heating chamber are connected to one another via a second passage, and the second and third heating chambers each have a floor which is inclined in the direction of the first heating chamber, wherein the first heating chamber has, in a bottom region thereof, a collecting well and a tapping opening, and the third heating chamber a discharge outlet at a side of the third heating chamber.

18. The apparatus according to claim 17, wherein one or more supply elements for oxygen are provided, each having an end in a collecting well located in a bottom region of the first heating chamber.

19. The apparatus according to claim 17, wherein the second heating chamber and the third heating chamber each contain, in an upper region thereof, a top furnace through which at least one heating electrode downwardly projects into the melt.

20. The apparatus according to claim 19, wherein the heating electrode is a graphite electrode.

21. The apparatus according to claim 19, wherein the heating electrode is in a shape of a hollow cylinder and forms a supply duct for the introduction of residues of fine particle size.

22. An apparatus for treatment of a solid residue from a refuse incineration plant, comprising a melting furnace, wherein the melting furnace comprises:

a first heating chamber having a heating device provided therein therein, wherein the first heating chamber has, in an upper region thereof, a top furnace wherein one or more downwardly directed oxygen burners are provided, a second heating chamber which is electrically heated; and a third heating chamber;

wherein the first heating chamber and the second heating chamber are connected to one another via a first passage and the second heating chamber and the third heating chamber are connected to one another via a second passage, and the first and third heating chambers each have a floor which is inclined in the direction of the second heating chamber, wherein the second heating chamber has, in a bottom region thereof, a collecting well and a tapping opening, and a discharge outlet is provided at a side of the third heating chamber for the discharge of melt substantially free from undesired elemental metal.

23. The apparatus according to claim 22, wherein one or more supply elements for oxygen are provided, each having an end in a collecting well located in a bottom region of the first heating chamber.

24. The apparatus according to claim 22, wherein the second heating chamber and the third heating chamber each contain, in an upper region thereof, a top furnace through which at least one heating electrode downwardly projects into the melt.

25. The apparatus according to claim 24, wherein the heating electrode is a graphite electrode.

26. The apparatus according to claim 24, wherein the heating electrode is in a shape of a hollow cylinder and forms a supply duct for the introduction of residues of fine particle size.

* * * * *